United States Patent [19]

Tani et al.

[11] 3,850,672
[45] Nov. 26, 1974

[54] COATED SYNTHETIC PAPER AND A METHOD OF PRODUCING THE SAME

[75] Inventors: Kaneyasu Tani; Yukio Fushino, both of Tokyo; Taiji Nakajima; Hiroaki Noguchi, both of Ageo; Yutaka Kurita, Tokyo; Satoshi Murakoshi; Hiroo Wakayama, both of Ichikawa, all of Japan

[73] Assignee: Nippon Kakoh Seishi Kabushiki Kaisha, Tokyo, Japan

[22] Filed: Dec. 7, 1972

[21] Appl. No.: 312,945

Related U.S. Application Data

[63] Continuation of Ser. No. 193,546, Oct. 28, 1971, and a continuation-in-part of Ser. No. 728,793, May 13, 1968.

[30] Foreign Application Priority Data

May 25, 1967  Japan .......................... 42-33301
Nov. 28, 1967  Japan .......................... 42-76251
Dec. 31, 1967  Japan .......................... 42-85249

[52] U.S. Cl. .................... 117/76 R, 117/138.8 E, 117/138.8 UA
[51] Int. Cl. ............................ B44d 5/00
[58] Field of Search ..... 117/73, 76 F, 93.31, 143 R, 117/138.8 E, 138 UA; 112/161 UD; 260/8

[56]  References Cited
UNITED STATES PATENTS

| 2,441,101 | 5/1948 | Mathews et al. .................. 260/8 |
| 2,923,641 | 2/1960 | Graf ................................ 117/143 R |
| 2,955,970 | 10/1960 | Rice et al. ........................ 117/73 |
| 3,021,229 | 2/1962 | Morgan .......................... 117/76 F |
| 3,398,016 | 8/1968 | Goldman et al. ................ 117/93.31 |
| 3,560,417 | 2/1971 | Pizzi et al. ....................... 260/8 |
| 3,598,642 | 8/1971 | Huang et al. ............ 117/161 UD X |

*Primary Examiner*—David Klein
*Assistant Examiner*—Alfonso T. Suro Pico
*Attorney, Agent, or Firm*—Cooper, Dunham, Clark, Griffen & Moran

[57]  ABSTRACT

Synthetic paper is produced by coating a plastic film with an aqueous composition containing a pigment-binder coating base and drying to yield a product having an opaque layer on the surface of the plastic film.

27 Claims, No Drawings

COATED SYNTHETIC PAPER AND A METHOD OF PRODUCING THE SAME

RELATED APPLICATION

This is a continuation of application Ser. No. 193,546, filed Oct. 28, 1971.

This application is a continuation-in-part of United States patent application Ser. No. 728,793 which was filed on May 13, 1968.

BACKGROUND OF THE INVENTION

Many attempts have been made to use polymer films as substitutes for paper. There are CaO.Al reasons for this. Polymer films have good tensile properties, they are chemically stable, and they are dimensionally stable. Unfortunately, they can be made to accept a printed image only with great difficulty and, because they are substantially transparent, such printed images are barely visible.

Attempts have been made to improve the printability of plastic films and the visibility of the printed image by coating the film with various coatings of the type often used to improve the quality of paper. These coatings usually contain a pigment and other materials which are initially mixed as an aqueous suspension which is then coated on the paper and dried.

Unlike paper which is made from cellulosic fibers, plastic films not only lack permeability to water and air, but are also highly water repellent. For these reasons, if the films are coated with conventional aqueous coating mixtures, the resulting products are unsatisfactory for a variety of reasons. More particularly, they are unsuitable for writing and printing, especially high speed printing.

Products are known which have been prepared by coating a smooth or roughened surface of a plastic film with an organic solvent coating mixture containing a pigment such as kaolin, calcium carbonate, talc, titanium dioxide, and the like, and synthetic binder or adhesive resin which may be of the polyvinyl or polyester type.

U.S. Pat. No. 2,955,970 discloses the preparation of a product described as a synthetic paper which is prepared by coating an activated polyethylene film with an aqueous coating material containing 100 parts of a pigment and 5 to 25 parts of a starch-synthetic rubber adhesive.

In the preparation of such products it is necessary to solve many technical production problems, in order to obtain products having the desirable qualities of coated paper such as surface bonding strength and printability. The latter term includes such qualities as ink receptivity, gloss and drying rates. Normally attempts to improve one attribute results in reduction in another property. For example, an increase in binder to improve bonding strength often causes a decrease in ink receptivity. Moreover, the surface of the product must normally be smooth and attractive and not subject to cracking or chipping off. As a result, no completely satisfactory products have yet been achieved.

One of the principal difficulties in the production of coated plastic films useful as substitutes for cellulosic paper is that the moisture of the coating composition cannot evaporate through the substrate. Evaporation is limited so that it takes place only in the direction of the surface exposed to the atmosphere. This is in contrast to conventional paper where the moisture escapes in both directions. For this purpose it is essential in the drying process to allow the coated film to dry at low temperatures with the continual maintainance of a balance between the moisture content of the surface layer and the inner layer. When the coated film is dried at low temperatures over an extended period of time bare spots often form on the surface of the coat. As a result the coat is rough and uneven and has a poor appearance. Bare spots are tiny uncoated areas which are formed by the partial repelling of the aqueous coating by the substrate, and also by contracting of said coat during protracted drying. Moreover, protracted drying procedures are not economically practical.

On the other hand, rapid drying often causes cracks to form in the coat because of the differential shrinkage caused by the sharp drying rate gradient throughout the thickness of the coat. This cannot be cured by the use of a more viscous coat with a higher solids content, because as the coating composition becomes more and more viscous the difficulties of obtaining a smooth, even coat increase to the point where it finally becomes impossible no matter what degree of care is employed.

The cracking problem can be alleviated, even under forced drying conditions by increasing the adhesive to pigment ratio. This procedure is not satisfactory, however, because the adhesive tends to migrate to the surface of the coat during drying so that there results an uneven distribution of the adhesive throughout the depth of the layer. The migration of the adhesive strengthens the surface of the coat, but is also has adverse effects upon the receptivity and drying of printing ink and, ultimately causes blocking of the product. This latter defect completely negates any possibility of using the products in modern, high speed printing.

In modern techniques it is necessary to use highly viscous inks for obtaining sharp images. The principal difficulty with synthetic papers which have heretofore been produced from plastic films is that when attempts are made to print with inks of number 12 tack or higher the top coat of the synthetic paper picks or pulls away and adheres to the surface of the printing plate. Attempts to overcome this problem by decreasing the viscosity of the printing ink have led to reduced ink receptivity with resulting transfer of image.

Despite the need for a synthetic paper, especially in those countries which have little or no paper pulp resources, and despite the mossive research efforts which have been expended no satisfactory paper substitute useful in high speed printing and in the graphic arts in general has yet been produced.

THE INVENTION

This invention in one aspect relates to a coated synthetic paper comprising flexible plastic films coated with an opaque surface layer. The synthetic paper is generally useful for substantially all of the conventional utilities of ordinary paper, and is particularly useful for high speed printing and the graphic arts. The products are formed by coating selected substrates with specifically selected aqueous coating compositions and thereafter drying. The products have printing characteristics and surface strength equivalent and often superior to conventional coated cellulosic paper. Additionally, they have all of the beneficial properties of the substrate plastic film including tensile strength and dimensional stability.

In another aspect, the invention relates to a method of producing such products.

In still another, it relates to the aqueous compositions which are used in the preparation of the paper substitutes.

It is an object of this invention to provide a novel coated synthetic paper which is substantially free from the drawbacks of the usual coated paper.

It is another object of the invention to provide a method of producing such novel synthetic paper products.

Still another object of the invention is to provide an aqueous coating mixture for use in the production of such synthetic paper products.

The products of this invention are from about 15 to 300 microns in thickness and comprise plastic films coated on at least one side with a coat containing from about 5 to 40 grams per square meter of a dry pigment containing coat comprising at least one layer in which each layer contain 100 parts pigment, and for each 100 parts of pigment from about 12 to 100 parts of an anionic latex type binder together with from about 0.2 to 0.7 parts of a dispersing agent. Each coat may comprise one or a plurality of layers, usually two. Normally if two layers are employed the bottom layer will contain a higher concentration of latex, e.g. about 28 to 100 parts latex per 100 parts pigment. The top layer will contain a lesser amount of binder, e.g. about 12 to 20 parts binder per 100 parts pigment. If there is only one layer in a coat, it is generally preferred that there be from about 20 to 26 parts latex or binder per 100 parts pigment. The presence of from about 2 to 20 parts of satin white will aid in inhibiting cracking of a coat and is especially useful in this respect if the coat contains only one layer.

The coat or each layer in the coat may contain from about 0.15 to 3 parts of a heat sensitive coagulating agent together with from about 0.75 to 4.5 parts of a non-ionic surfactant protective agent. A heat sensitive coagulating agent is an agent which is stable at room temperature or at relatively low temperatures, but which will coagulate the coating mixture at about the clogging temperature. The protective agent serves the dual function of promoting the stability of the coating mixture at lower temperatures, especially room temperatures and augmenting the coagulation of the same at increased temperature.

The plastic films useful in the process of this invention for the preparation of the novel products hereof generally include all of those thermoplastics which can be formed into a film and coated by the treatment to be hereinafter described. They include, for example, polyvinyl plastics, particularly polyvinyl chloride and copolymers of vinyl chloride with vinyl esters such as vinyl acetate and with vinylidene compounds particularly vinylidene chloride. They include also polyvinyl polymers based on styrene and various known copolymers thereof. Polyolefins, particularly polyethylene and polypropylene can also be employed. There may be mentioned by way of further examples, films formed from polyamides, polyesters, polyurethanes, natural and synthetic rubbers, polycarbonates, polymers based on cellulose, and the like. The films may be plasticized or unplasticized. They may be stretch oriented or untreated in this respect. Each of these films when treated in accordance with the process of this invention can be converted to the useful products described and claimed herein. Of the many products which are available as a result of the invention, those based on polystyrene, polyvinyl chloride and polyethylene are preferred since the raw materials are readily available at reasonable cost and since the products produced have especially advantageous properties for a number of applications.

The term "pigment" as used herein refers to any and all pigments generally used in the coating of ordinary paper to produce printable surfaces. It includes, for example, kaolin and other types of clay, calcium carbonate, talc, titanium dioxide, and the like.

The anionic type binders useful in this invention are a well known class of latex type adhesives and include, for example, various acrylic polymers, modified styrene-butadiene rubber, modified methyl methacrylatebutadiene rubber, styrene-methyl methacrylatebutadiene rubber, acrylonitrile-butadiene rubber, ethylene-vinyl acetate copolymers and similar polymers and copolymers.

Up to about 10 percent of the latex type adhesives in each layer may be replaced with a non-latex type binder or adhesive. In fact in preferred modifications, about 7 to 10 percent of the binder will be a non-latex type adhesive such as casein, starch, modified starch, polyvinyl alcohols, and the like.

In case that the larger amount of the latex type adhesives, when it is used as a sole binder or in combination with non-latex type binder in quantity of about 7 to 10 percent of the binder, are contained in coating mixture, surface bonding of coated synthetic paper is increased according to the amount of binder and smooth and even surface is obtained. However, the binders migrate to the surface of the coat during drying, so that there results an uneven distribution of the binders throughout the depth of the layer, and decreases the receptivity and drying of printing ink.

Nevertheless, the migration of the binder in bottom layer in two layers coating does not decrease the receptivity and drying of printing ink, because the top layer which contains another amounts of adhesive of the two layer coating covers the bottom layer and prevent adverse effect of bottom layer upon the receptivity and drying of printing ink.

The heat-sensitive coagulating agents usable in this invention are of a well known class of compounds similarly employed in the preparation of papers and fabrics which are impregnated with resins. They may be any one or a mixture of salts of divalent lead, zinc, magnesium, calcium, strontium, and barium and trivalent chromium and aluminum in combination with a member of the group consisting of sulfate, phosphate, nitrate, isocyanate and halogen ions; polyvinyl methyl ether, polypropylene glycol; and cationic surface active agents having both a hydrophobic group selected from the group consisting of higher alkyl amines, higher alkyl halides and higher fatty acids, and a hydrophillic group consisting of pyridine, inorganic acids, ethylene oxide, ethanolamines, asymmetrical diamines, aminoethanolamine, any polyethylene-polyamines. The polyvalent metal salts are not limited to single salts consisting of a cation and a anion but also include complex and double salts as well.

These heat sensitive coagulating agents, when employed or present in the coating mixture, exhibit a coagulating action on heating thereby preventing migration of the binder adhesive and enhancing the printability and anti-blocking tendency of the coated surface. They are employed at a level of from about 0.15 to 3 parts per hundred parts of pigment. As will be explained more fully hereinafter certain products within the scope of this invention can be prepared with increasing quantities of satin white and if this route is followed there is no advantage to be gained by using less than 0.15 parts of the coagulating agent. Premature coagulation will result if appreciably more than 3 parts of the coagulating agent is employed.

The heat coagulating agent is utilized in association with a non-ionic surfactant which is referred to herein as a protective agent. Examples of suitable surfactants include ethylene oxide adducts of higher alcohols, alkyl phenols, fatty acids, polyhydric alcohol-fatty acid esters, higher alkyl amines, fatty acid amides, fatty oils, and polypropylene glycol. A few simple observations will easily establish the suitability and effective quantity of a particular non-ionic surfactant for the preparation of the products of this invention. It has generally been observed that an effective amount is from about 0.75 to 4.5 parts per one hundred parts of pigment.

In the preparation of the compositions of this invention employing heat sensitive and protective agents, the two are mixed together and added to the aqueous coating mixture or the protective agent is added to the coating mixture before the heat sensitive coagulating agent. Otherwise the viscosity of the mixture increases to the point where it is difficult to work.

A dispersing agent of mixtures of dispensing agents are utilized in the preparation of the compositions of this invention. Typically the compositions will contain from about 0.2 to 0.7 parts per hundred parts of pigment. Phosphates are generally preferred, although others may be used. Alkali metal phosphates such as sodium phosphate, pyrophosphate, metaphosphate, hexametaphosphate and tripoliphosphate may be mentioned by way of example.

Satin white is a calcium sulfo-aluminate and may be represented by the formula $3CaO.Al_2O_3.3CaSO_4.31-H_2O$. It is prepared by reacting hydrated lime and aluminum sulfate. It is especially useful in the practice of this invention because of its excellent water retention qualities. It is especially useful in inhibiting the formation of cracks, even under forced drying conditions. Under appropriate conditions products of the invention can be prepared with satin white in a surface coat which is free from the heat sensitive coagulating agent or the protective agent. Such products will have two layers in the surface coat with a lesser amount of binder in the top coat in order to inhibit migration. Normally the amount of satin white used in the products of the invention is from about 2 to 20 parts per 100 parts of pigment.

The coating mixtures of the present invention may contain, in addition to the specific agents listed above, dyes, colorants, antistatic agents and other conventional ingredients used in the paper coating arts.

The plastic films used in the practice of the invention may be coated in the same manner employed for the coating of conventional paper utilizing any of the usual coating devices such as a roll coater, a blade or an air knife. The preferred method of coating depends to some degree on the viscosity of the composition to be coated, which normally varies from about 50 to about 1,000 cps as measured, for example, on the Brookfield Synchroelectric Viscometer. The weight of the aqueous coating on a wet basis is from about 8 to 130 grams per square meter. When dried this is about 5 to 40 grams per square meter. It is preferred from the point of view of economy and practical results that the wet weight vary from 25 to 70, and the dry weight from 15 to 30 grams per square meter.

After the wet coating operation, the coating, or each separate layer thereof, is dried to evaporate the water and produce a smooth, even, opaque, printable surface. Contrary to previously known products, the products of this invention may be dried without adverse effects under forced drying conditions. Conventional drying equipment may be employed, for example tunnel or cylinder dryers.

In one method of drying, the coomplete operation is carried out under forced conditions which may vary from as low as 70°C to as much as 50°C above the softening point of the plastic during a period of from about 10 seconds to about 2 minutes. It is generally preferred to maintain the temperatures below the softening point of the film, e.g. about 15°C below the softening point. The preferred time range for this procedure is from about 10 to 40 seconds.

Another method, which is preferred with products which contain lesser amounts, or are even free from heat coagulating and protective agents, is to carry out the initial stage of the drying under the forced conditions described above until the viscosity of the coating is from about 1,800 to 2,000 cps and to then continue drying at a temperature of from about 20°C to 60°C until the product has reached the desired degree of dryness, e.g. about 3 to 10 minutes.

Still another method, which is preferred when the top layer of the product which is free from satin white, is to carry out the initial stage of the drying at the temperature of from about 20°C to 60°C until the viscosity of the coating is from about 1,800 to 2,000 cps and then continue drying under the forced condition described above until the product has reached the desirable degree of dryness.

Clearly the optimum drying conditions will vary somewhat with each type of coating operation, or with the number of layers or with each kind of coating mixture. Generally, however, the conditions will range from about 20°C to about 50°C above the softening point of the plastic during a period of from about 10 seconds to about 10 minutes. The first method and the third method may be the method of choice with some coating mixtures, and the second method the method of choice with others. The first method achieves products which are smooth, even and free from bare spots, having sufficient bonding strength to withstand ordinary writing and printing. The bonding strength of products prepared by the second method is normally better, however. Alternatively, the bonding strength can be improved by supercalendering, and this process has the added virtue of improving the printing quality of the opaque film sill further.

An added feature of this invention is the stability of the novel aqueous coating compositions. Because of this stability the compositions, especially those containing the heat coagulating and protecting agents can be prepared as much as 48 hours in advance of actual use.

The following examples are given by way of illustration only and should not be understood as limitations of this invention, many apparent variations of which are possible without departing from the spirit of scope thereof.

EXAMPLE 1

The following films were coated with 23 g/m² of an aqueous coating of the composition shown below by means of an air-knife coater at 100 m/min., and the coated films were dried in a force-draft drier at 70°-80°C for about 20 seconds.

Biaxially oriented polystyrene (75 μ thick), polyvinyl chloride (100 μ), polyvinyl chloride containing 10% acrylonitrile-butadiene-styrene copolymer (150 μ), and biaxially-oriented polyethylene therephthalate (50 μ).

| | | | |
|---|---|---|---|
| Pigment: | Kaolin | 80 | parts |
| | Titanium dioxide | 20 | do. |
| | Satin white | 10 | do. |
| Dispersing agent: | Sodium tripoliphosphate | 0.3 | part |
| Binder: | Casein | 2 | parts |
| | Butadiene-methyl methacrylate latex, Polylac ML 501 | 22 | do. |
| Coagulating agent: | Chromic stearate chloride Quilon C | 2 | parts |
| Protective agent: | Polyethylene glycol-polypropylene glycol ether Epan 740 | 1 | part |
| Total solid: 47%, approx. Viscosity: 450 cps | | | |

The resulting coats were found to be smooth and even, and had a good bonding strength (adhesive tape test) to the substrate film. In the offset printing test it was found that the printing ink dried quickly, leaving well-defined printed images.

The pick resistance of the coates averaged 210 cm/sec., and increased to 320 m/sec. after supercalendering.

The strength values were measured with an IGT tester using IGT Tack No. 18 ink at an impression pressure of 35 kg/cm².

The coagulation point, as well as the stability values at 25°C and 60°C, respectively, of each mixture is shown in the lower part of Table 1. The stability values were rated A, B, C and D with the value for the coagulant-free sample being taken as A. Legend D stands for complete coagulation.

EXAMPLE 2

Example 1 was repeated except that each sample was first passed through a hot air dryer at 110°C for about 5 seconds and, then, was dried in the Festoon dryer at 50°C. The furface condition of each of the resulting coated films was as satisfactory as that of the sample of Example 1. The surface strength of all samples of this example without supercalendering was 330 cm/sec., or more.

EXAMPLE 3

High impact polystyrene films, 75 μ thick each, were coated with one coat of the formulation of Table 1, respectively, by means of an applicator bar, and the coated samples were subjected to 2 minutes forced drying at 70°C, followed by supercalendering.

The resulting coated films were tested in the same manner as in Example 1.

In this example, the coating mixture was prepared in the following manner.

One hundred parts by weight of a pigment mixture (80 parts clay and 20 parts titanium dioxide) were dispersed into a slurry with 0.3 part of sodium tripoliphosphate and while the slurry was stirred, a protective agent, heat-sensitive coagulating agent, auxiliary adhesive, satin white dispersion and anionic latex type adhesive were added in succession so that the total solid content indicated in the table was reached.

The identity of the products in Table 1 is as follows:

| | |
|---|---|
| *Latex 1 | — Polylac ML 501 |
| **Latex 2 | — Polylac ML 505 |
| ***Cationic surfactant | — Higher alkylamine salt, PB40 |
| ****Protective agent | — Epan 740 |

The properties of the coats are shown in Table 2.

Table 1

| Components | Composition No. 1 | 2 | 3 | 4 | 5 | 6 |
|---|---|---|---|---|---|---|
| Pigment | 100 | 100 | 100 | 100 | 100 | 100 |
| Satin white | 4.5 | 4.5 | 4.5 | 4.5 | 4.5 | 4.5 |
| Adhesive Latex 1* | 22 | — | 20 | 22 | 22 | 22 |
| Adhesive Latex 2** | — | 25 | — | — | — | — |
| Auxiliary adhesive: Casein | 2 | 1 | 2 | 2 | 2 | 2 |
| Heat sensitive coagulant Na₂SiF₆ | 1 | — | — | — | — | — |
| ZnO | 0.5 | 1.5 | — | — | — | — |
| NH₄NO₃ | — | 0.5 | — | — | — | — |
| NH₄OH | — | 0.5 | — | — | — | — |
| ZnSO₄ | — | — | — | — | — | — |
| [Zn(NH₃)₄]Cl₂ | — | — | 1.5 | — | — | — |
| ZnSO₄(NH₄)₂SO₄ | — | — | — | — | — | — |
| Polyvinyl methyl ether | — | — | — | 1.2 | — | — |
| Polypropylene glycol | — | — | — | — | 1.2 | — |
| Cationic surfactant** | — | — | — | — | — | 1 |
| Protective agent*** | 1 | 1 | 1 | 1 | 1 | 1.5 |
| Total solid (%) | 47 | 45 | 46 | 48 | 48 | 45 |
| Coagulation point (°C) | 55 | 60 | 58 | 35 | 57 | 55 |
| Stability of coating at 25°C | B | B | B | B | B | B |
| Stability of coating at 60°C | D | D | D | D | D | D |
| Coating weight (g/m²) | 20 | 20 | 20 | 20 | 20 | 20 |

Table 2

| Composition No. | 1 | 2 | 3 | 4 | 5 | 6 |
|---|---|---|---|---|---|---|
| Strength: | | | | | | |
| Pick resistance* | A | A | A | A | A | A |
| IGT** | 330 | 330 | 330 | 330 | 330 | 330 |
| RI (wet)*** | A | A | A | A | A | A |
| Printability: | | | | | | |
| Ink receptivity | A | A | A | A | A | A |
| Ink absorption | A | A | A | A | A | A |
| Ink drying | A | A | A | A | A | A |
| Offset-printability | A | A | A | A | A | A |
| Others*** | | | | | | |
| Surface smoothness | A | A | A | A | A | A |
| Print gloss | A | A | A | A | A | A |
| Print through | A | A | A | A | A | A |
| Offset of ink | A | A | A | A | A | A |
| Anti-blocking effect | A | A | A | A | A | A |

The measurement or evaluations made for various items in Table 2 were carried out as follows:

* Pick resistance — Based on the picking test using adhesive tape (Sekisui Cellotape: Sekisui Kagaku Kogyo K.K.), the samples were rated A, B and C in the order of decreasing difficulty of delaminating.

** IGT — The results using IGT Tack No.18 ink at a cylinder pressure of 35 kg/cm² are expressed in centimeters/sec.

*** RI (wet) — The pick resistance after wetting of the samples as measured with an RI tester were rated A, B and C in the order of decreasing values.

**** Others — For other test items, the samples were rated A, B and C with the values for conventional coated paper being taken as B.

Example 4

Biaxially oriented polystyrene film, 75 microns thick, was coated with Formula 1 by means of air-knife coater on one side, to a coating weight of 10 gr./sq.m, and the coated sample was subjected to 18 seconds of drying at 100°C.

The resulting coated sample was then again coated with the Formula 2 by means of air-knife coater over the coated side, with coating weight of 20 gr./sq.m. It was subjected to 1 minute drying at 55°C, then again to 20 seconds of drying at 100°C, followed by supercalendering.

Formula 1

| Pigment | Kaolin Clay | 80 parts | |
| | Titanium dioxide | 20 parts | 100 parts |
| Dispersing agent | Sodium tripoliphosphate | | 0.3 part |
| Binder | Polylac ML 501 Latex | | 35 parts |
| | Casein | | 3 parts |
| Heat sensitve coagulating agent | Zinc sulphate | | 2 parts |
| Protective agent | Epan 740 | | 1 part |
| Concentration | 48% | | |

Formula 2

| Pigment | Koalin Clay | 80 parts | |
| | Titanium dioxide | 20 parts | 100 parts |
| Dispersing agent | Sodium tripoliphosphate | | 0.3 part |
| Binder | Polylac ML 501 Latex | | 20 parts |
| Heat sensitive coagulating agent | ZnSO$_4$(NH$_4$)$_2$SO$_4$ | | 1.5 parts |
| Protective agent | Epan 740 | | 1 part |
| Concentration | 46% | | |

The resulting coated film was tested in the same manner as in Example 1. In this example, the coating mixture was prepared in the same manner as in Example 3.

Properties of the coated synthetic paper obtained by the procedure of the present example is as follows:

Table 3

| Strength: | |
|---|---|
| Pick resistance* | A |
| IGT** | 330 |
| RI (wet)*** | A |
| Printability: | |
| Ink receptivity | A |
| Ink absorption | A |
| Ink drying | A |
| Offset-printability | A |
| Others**** | |
| Surface smoothness | A |
| Printgloss | A |
| Print through | A |
| Offset of ink | A |
| Anti-blocking effect | A |

EXAMPLE 5

High impact polystyrene film, 75 microns thick, was coated with the formula 1 by means of air-knife coater on one side, to a coating weight of 10 g/m², and the coated sample was subjected to 15 seconds of drying at 100°C, then again to 5 minutes of drying at 50°C.

The resulting coated sample was then again coated with the Formula 2 by means of air-knife coater over the coated side, with coating weight of 15 g/m². It was subjected to 2 minutes of drying at 70°C, followed by supercalendering.

Formula 1

| Pigment | Koalin Clay | 80 parts | |
| | Titanium dioxide | 20 do. | 100 parts |
| | Satin white | | 5 do. |
| Dispersing agent | Sodium tripoliphosphate | | 0.5 part |
| Binder | Polylac ML 501 Latex | | 30 parts |
| Heat sensitive coagulating agent | Zinc chloride | | 2.5 parts |
| Protective agent | Epan 740 | | 1.5 parts |
| Concentration: | 46% | | |
| Viscosity: | 500 cps | | |

Formula 2

| Pigment | Koalin Clay | 70 parts | |
| | Calcium carbonate | 20 do. | |
| | Titanium dioxide | 10 do. | 100 parts |
| | Satin white | | 5 do. |
| Dispersing agent | Sodium tripoliphosphate | | 0.5 part |
| Binder | Polylac ML 501 Latex | | 15 parts |
| Heat sensitive coagulating agent | Zinc chloride | | 1.5 parts |
| Protective agent | Epan 740 | | 1.0 part |

Properties of the coated synthetic paper obtained by the procedure of the present example is as follows:

| Strength: | |
|---|---|
| Pick resistance | A |
| IGT | 330 |
| IR (wet) | A |
| Printability: | |
| Ink receptivity | A |
| Ink absorption | A |
| Ink drying | A |
| Offset printability | A |
| Others: | |
| Surface smoothness | A |
| Print Gloss | A |
| Offset of ink | A |
| Anti-blocking effect | A |

The identity of certain of the products used in the above examples, are listed below:
Polylac ML 501 (Manufactured by Toyo Koatsu)
Polylac ML 505 (Manufactured by Toyo Koatsu)
Quilon (Manufactured by duPont)
Epan 740 (Manufactured by Dai Ichi Kogyo Seiyaku)
PB 40 (Manufactured by Dai Ichi Kogyo Seiyaku)

EXAMPLE 6

High impact polystyrene film, 75 microns thick, was coated with the formula 1 by means of air-knife coater on one side, to a coating weight of 10 grams per square meter and the coated sample was subjected to 18 seconds of drying at 110°C. The resulting coated sample was then again coated with the formula 2 by means of air-knife coater over the coated side, with coating weight of 20 grams per square meter. It was subjected to 10 seconds of drying at 100°C, then again to 5 minutes of drying at 50°C.

Formula 1

| | | | |
|---|---|---|---|
| Pigment | Koalin Clay | 80 parts | |
| | Titanium dioxide | 20 do. | 100 parts |
| | Satin white | 4.5 do. | |
| Dispersing agent | Sodium tripoliphosphate | | 0.5 part |
| Binder | Polylac ML501 latex | | 80 parts |
| | Casein | | 7 parts |

Formula 2

| | | | |
|---|---|---|---|
| Pigment | Koalin Clay | 70 parts | |
| | Calcium carbonate | 20 do. | 100 parts |
| | Titanium dioxide | 10 do. | |
| | Satin white | | 2.5 do. |
| Dispersing agent | Sodium tripoliphosphate | | 0.5 part |
| Binder | Polylac ML501 Latex | | 15 parts |
| | Casein | | 1.0 part |

The property of the coated synthetic paper obtained by the procedure of the present examples are same as example 5.

EXAMPLE 7

High impact polystyrene film, 75 microns thick, was coated with the formula 1 described in example 6 by means of air-knife coated on one side, to a coating weight of 10 grams per square meter and the coated sample was then again coated with the formula 2 described in example 6 by means of air-knife coater over the coated side with coating weight of 18 grams per square meter. It was subjected to 20 seconds of drying at 100°C.

The property of the coated synthetic paper obtained by the procedure described above are same as Example 5.

EXAMPLE 8

Biaxially oriented high impact polystyrene film, 75 microns thick, was coated with the composition shown below by means of an applicator bar on one side, to a coating weight of 20 g/m², and the coated sample was subjected to 2 minutes forced drying at 80°C.

The resulting coated sample was then again coated with the same composition shown below by means of an applicator bar over the uncoated side, with coating weight of 20 g/m². It was subjected to 2 minutes of drying at 80°C, followed by supercalendering.

| | | | |
|---|---|---|---|
| Pigment | Koalin Clay | 70 parts | |
| | Calcium carbonate | 20 parts | |
| | Titanium dioxide | 10 parts | 100 parts |
| | Satin white | | 5 parts |
| Dispersing agent | Sodium tripoliphosphate | | 0.5 part |
| Binder | Polylac ML 501 Latex | | 20 parts |
| Heat sensitive coagulating agent | Zinc chloride | | 1.5 parts |
| Protective agent | Epan 740 | | 1.0 part |

The property of the coated synthetic paper obtained by the procedure described above are same as example 5.

EXAMPLE 9

Biaxially oriented polystyrene film, 50 microns thick, was coated with the Formula 1 by means of air-knife coater on one side, to a coating weight 10 g/m², and the coated sample was subjected to 18 seconds of drying at 110°C.

The resulting coated sample was then again coated with the Formula 2 by means of air-knife coater over the coated side, with coating weight of 10 g/m². It was subjected to 15 seconds of drying at 100°C, then again to 5 minutes of drying at 50°C.

The resulting two layers coated sample was then again coated with the Formula 3 by means of air-knife coater over the two layers coated side, with coating weight of 10 g/m². It was subjected to 2 of drying at 80°C, followed by supercalendering.

Formula 1

| | | |
|---|---|---|
| Pigment | Koalin clay | 100 parts |
| | Satin white | 3 parts |
| Dispersing agent | Sodium tripoliphosphate | 0.3 part |
| Binder | Polylac ML 505 Latex | 55 parts |
| | Casein | 5 parts |
| Heat sensitive coagulating agent | ZnSO₄ | 1.0 part |
| | NH₄NO₃ | 1 part |
| Protective agent | Epan 740 | 1 part |
| Concentration | 45% | |

Formula 2

| | | | |
|---|---|---|---|
| Pigment | Kaolin clay | 80 parts | |
| | Titanium dioxide | 20 parts | 100 parts |
| | Satin white | | 4.5 parts |
| Dispersing agent | Sodium tripoliphosphate | | 0.5 part |
| Binder | Polylac ML 505 Latex | | 19 parts |
| | Casein | | 1 part |
| Heat sensitive coagulating agent | Zinc chloride | | 1 part |
| Protective agent | Epan 740 | | 1 part |

Formula 3

| | | | |
|---|---|---|---|
| Pigment | Kaolin clay | 70 parts | |
| | Calcium carbonate | 20 parts | |
| | Titanium dioxide | 10 parts | 100 parts |
| | Satin white | | 3.5 parts |
| Dispersing agent | Sodium tripoliphosphate | | 0.5 part |
| Binder | Polylac ML 501 Latex | | 15 parts |
| Heat sensitive coagulating agent | Polypropylene glycol | | 1.2 parts |
| Protective agent | Epan 740 | | 1 part |
| Concentration | 46% | | |

The property of the coated synthetic paper obtained by the procedure described above are same as example 5.

EXAMPLE 10

Polyvinyl chloride film, 100 microns thick, was coated with the Formula 1 by means of air-knife coater on one side, to a coating weight of 8 g/m², and the coated sample was subjected to 2 minutes of drying at 80°C.

The resulting coated sample was then again coated with the Formula 2 by means of air-knife coater over the coated side, with coating weight of 17 g/m². It was subjected to 15 seconds of drying at 95°C, then again to 5 minutes of drying at 50°C, followed by supercalendering.

Formula 1

| | | | |
|---|---|---|---|
| Pigment | Kaolin clay | 90 parts | |
| | Titanium dioxide | 10 parts | 100 parts |
| | Satin white | | 4.0 parts |
| Dispersing agent | Sodium tripoliphosphate | | 0.5 parts |
| Binder | Polylac ML 505 Latex | | 38 parts |
| | Casein | | 2 parts |

Formula 2

| | | | |
|---|---|---|---|
| Pigment | Kaolin clay | 70 parts | |
| | Calcium carbonate | 20 parts | |
| | Titanium dioxide | 10 parts | 100 parts |
| | Satin white | | 4.5 parts |
| Dispersing agent | Sodium tripoliphosphate | | 0.5 part |
| Binder | Polylac ML 505 Latex | | 15 parts |

The property of the coated synthetic paper obtained by the procedure described above are same as example 5.

EXAMPLE 11

High impact polystyrene films, 75 $\mu$ thick each, were coated with the formulation of Table 4 on one side, respectively, by means of an applicator bar, and the coated samples were dried under the condition of Table 5.

The resulting coated samples were then again coated with the formulation of Table 6 over the coated side, respectively, by means of an applicator bar. They were dried under the condition of Table 7, followed by supercalendering.

The properties of the coated synthetic papers obtained are shown in Table 8.

Table 4

| Components | Composition No. | 1 | 2 | 3 | 4 | 5 | 6 |
|---|---|---|---|---|---|---|---|
| Pigment | Kaolin clay | 100 | 90 | 100 | 90 | 90 | 100 |
| | Calcium carbonate | — | 10 | — | — | — | — |
| | Titanium dioxide | — | — | — | 10 | 10 | — |
| Satin white | | — | 8 | 5 | 4 | 4.5 | — |
| Dispersing agent: Sodium tripoliphosphate | | 0.5 | 0.6 | 0.6 | 0.6 | 0.5 | 0.5 |
| Adhesive Polylac ML 501 Latex | | 60 | 70 | 50 | 65 | 40 | 35 |
| Auxiliary adhesive: Casein | | 5 | — | — | — | 3 | 2 |
| Heat sensitive coagulant | $Na_2SiF_6$ | 1.5 | — | — | — | — | — |
| | ZnO | 1.0 | — | — | — | — | — |
| | $NH_4NO_3$ | — | — | 1.0 | — | — | — |
| | $NH_4OH$ | — | — | — | — | — | 1.5 |
| | $[Zn(NH_3)_4]Cl_2$ | — | — | 0.5 | — | — | — |
| | Polypropylene glycol | — | — | — | — | 1.2 | — |
| Protective agent: Epan 740 | | 2.0 | — | 1.5 | — | 1.0 | 1.2 |
| Coating Weight (g/m²) | | 10 | 8 | 10 | 8 | 8 | 10 |

Table 5

| Drying condition | Composition No. | 1 | 2 | 3 | 4 | 5 | 6 |
|---|---|---|---|---|---|---|---|
| First step | Drying temperature (°C) | 90 | 100 | 110 | 110 | 90 | 90 |
| | Drying time (second) | 19 | 25 | 20 | 15 | 30 | 20 |
| Second step | Drying temperature (°C) | 50 | — | — | 50 | — | 50 |
| | Drying time (second) | 350 | — | — | 180 | — | 200 |

Table 6

| Components | Composition No. | 1 | 2 | 3 | 4 | 5 | 6 |
|---|---|---|---|---|---|---|---|
| Pigment | Kaolin clay | 80 | 70 | 80 | 90 | 90 | 70 |
| | Calcium carbonate | 15 | 20 | 10 | — | — | 20 |
| | Titanium dioxide | 5 | 10 | 10 | 10 | 10 | 10 |
| Satin white | | 5 | — | 4.5 | 5 | — | 4.5 |
| Dispersing agent: Sodium tripoliphosphate | | 0.6 | 0.5 | 0.5 | 0.5 | 0.6 | 0.5 |
| Adhesive Polylac ML 501 Latex | | 15 | 18 | 15 | 16 | 18 | 14 |

Table 6—Continued

| Components | | Composition No. 1 | 2 | 3 | 4 | 5 | 6 |
|---|---|---|---|---|---|---|---|
| Auxiliary adhesive: | Casein | — | — | 1 | — | — | 1 |
| Heat sensitive coagulant | $Na_2SiF_6$ | — | 1.0 | — | — | — | — |
| | ZnO | — | 0.5 | — | — | — | — |
| | $NH_4NO_3$ | — | — | — | 1.2 | — | — |
| | $NH_4OH$ | — | — | — | 0.3 | — | — |
| | $[Zn(NH_3)_4]Cl_2$ | — | — | — | — | — | 1.2 |
| | Polypropylene glycol | — | — | — | — | 1.2 | — |
| Protective agent: | Epan 740 | — | 1.5 | — | 1.2 | 1.0 | 1.0 |
| Coating Weight (g/m²) | | 15 | 18 | 15 | 20 | 20 | 15 |

Table 7

| Drying condition | | Composition No. 1 | 2 | 3 | 4 | 5 | 6 |
|---|---|---|---|---|---|---|---|
| First step | Drying temperature (°C) | 100 | 55 | 110 | 110 | 55 | 100 |
| | Drying time (second) | 15 | 60 | 15 | 30 | 55 | 35 |
| Second Step | Drying temperature (°C) | 50 | 100 | 50 | — | 90 | — |
| | Drying time (second) | 300 | 20 | 30 | — | 180 | — |

Table 8

| Composition No. | 1 | 2 | 3 | 4 | 5 | 6 |
|---|---|---|---|---|---|---|
| Strength: | | | | | | |
| Pick resistance | A | A | A | A | A | A |
| IGT | 330 | 330 | 330 | 330 | 330 | 330 |
| RI (wet) | A | A | A | A | A | A |
| Printability: | | | | | | |
| Ink receptivity | A | A | A | A | A | A |
| Ink absorption | A | A | A | A | A | A |
| Ink drying | A | A | A | A | A | A |
| Offset-printability | A | A | A | A | A | A |
| Others: | | | | | | |
| Surface smoothness | A | A | A | A | A | A |
| Print gloss | A | A | A | A | A | A |
| Print through | A | A | A | A | A | A |
| Offset of ink | A | A | A | A | A | A |
| Anti-blocking effect | A | A | A | A | A | A |

The characteristics of certain of the products used in the above examples as provided by the manufacturer are listed below:

Polylac ML 501:
 Type: MBR Latex
 Constitution: Butadiene/methyl-methacrylate
 Properties:
  Solid component (%) 47.5
  Specific gravity, 25°C 1.03
  pH 6–7
  Brookfield viscosity, 20°C (cps) ca 3
  Particle diameter (micron) 0.15
 Characteristics & applications: Used in paper coating in combination with casein to improve printability of printing paper and paperboard. Suitable for use as binder for coated fabrics and binder for printing.

Polylac ML 505:
 Type: Carboxyl-modified MBR Latex
 Constitution: Butadiene/methyl-methacrylate
 Properties:
  Solid component (%) 47.0
  Specific gravity, 25°C 1.03
  pH 8.9–9.5
  Brookfield viscosity, 20°C (cps) 100–200
  Particle diameter (micron) 0.15–0.25
 Characteristics & applications: Used in paper coating in combination with casein or starch. Especially suited for use with starch.

Quilon:
 Type: Water repelling agent
 Constitution: Stearate chromic chloride
 Properties:
  Solid component (%) 30
  Specific gravity ca. 1
  Solvent Isopropanol
 Characteristics & applications: Used for leather, fiber, paper and paperboard.

Epan 740:
 Type: Non-ionic surface active agent
 Constitution: Polypropylene-glycol/polyethylene-glycol
 Molecular weight of hydrophobic radical, namely polypropylene-glycol is 2,000, while that of hydrophile radical, namely polyethylene-glycol is 3,000.

PB40:
 Type: Cationic surface active agent
 Constitution: Trimethyl-hexadecyl-ammonium chloride
 Properties: Transparent and liquid
 Stable to acid, base and hard water
 Applications: Used as invert soap effective in disinfection.

What is claimed is:

1. A coated synthetic paper from about 15 to 300 microns in thickness comprising a plastic film coated on at least one side with from about 5 to 40 grams per square meter of an opaque, printable, pigment containing coat comprising two layers, the top layer containing for each 100 parts of pigment from about 12 to 20 parts of an anionic latex type binder, from about 0.2 to 0.7 part of dispersing agent and from about 2 to 20 parts of satin white, from 0.75 to 4.5 parts of a non-ionic surfactant protective agent and from 0.15 to 3 parts of a heat sensitive coagulating agent selected from the group consisting of water soluble salts of divalent lead, zinc, magnesium, calcium, strontium and barium and trivalent chromium and aluminum in combination with a member of the group consisting of sulphate, phosphite, nitrate and isocyanate and halogen ions; polyvinyl methyl ether, polypropylene glycol; and cationic surface active agents having both a hydrophobic group selected from the group consisting of higher alkyl amines, higher alkyl halides and higher fatty acids, and a hydrophilic group consisting of pyridine, inorganic acids, ethylene oxide, ethanolamines, asymmetrical diamines, aminoethanolamine and polyethylene-polyamines, and the bottom layer containing for each 100 parts of pigment from about 28 to 100 parts of an anionic latex type binder, from about 0.2 to 0.7 parts of dispersing agent, and from about 2 to 20 parts of satin white.

2. A synthetic paper as in claim 1 wherein the film is selected from the group consisting of polystyrene, polyvinyl chloride and polyethylene.

3. A synthetic paper as in claim 1 wherein the binder is a butadiene-methyl methacrylate copolymer.

4. A process for the preparation of a coated synthetic paper from about 5 to 300 microns in thickness which comprises coating a plastic film on at least one side with from about 8 to 130 grams per square meter of an aqueous, pigment containing composition having a viscosity of from about 50 to 1000 cps, said composition containing for each 100 parts of pigment from about 28 to 100 parts of an anionic latex type binder, from about 0.2 to 0.7 part of dispersing agent, 2 to 20 parts of satin white and from 0.75 to 4.5 parts of a non-ionic surfactant protecting agent, and thereafter drying at a temperature of from about 20°C to a temperature which is about 50°C above the softening point of the plastic film for a period of from about 10 seconds to 10 minutes, then again coating the resulting coated film over the coated side with from about 8 to 130 grams per square meter of an aqueous, pigment containing composition having a viscosity of from about 50 to 1000 cps, said composition containing for each 100 parts of pigment from about 12 to 20 parts of an anionic latex type binder, from about 0.2 to 0.7 part of dispersing agent and 2 to 20 parts of satin white and thereafter drying at a temperature of from about 20°C to a temperature which is about 50°C above the softening point of the plastic film for a period of from about 10 seconds to 10 minutes.

5. A process as in claim 4 wherein drying of the first layer is effected at a temperature of from about 70°C to a temperature which is about 50°C above the softening point of the plastic film during a period of from about 10 seconds to 2 minutes and drying of the second layer is effected in two steps, the first step being a temperature from about 70°C to a temperature which is about 50°C above the softening point of the plastic film until the viscosity of the coating is from about 1,800 to 2,000 cps, the second step being at about 20°C to 60°C for from about 3 to 10 minutes.

6. A process as in claim 4 wherein drying of each layer is effected in two steps, the first step being from about 70°C to a temperature which is about 50°C above the softening point of the plastic film until the viscosity of the coating is from about 1,800 to 2,000 cps, the second step being at about 20°C to 60°C for from about 3 to 10 minutes.

7. A coated synthetic paper from about 15 to 300 microns in thickness comprising a plastic film coated on at least one side with from about 5 to 40 grams per square meter of an opaque, printable, pigment containing coat comprising two layers, the top layer containing for each 100 parts of pigment from about 12 to 20 parts of an anionic latex type binder, from about 0.2 to 0.1 parts of dispersing agent, from 0.75 to 4.5 part of a non-ionic surfactant protective agent and from 0.15 to 3 parts of a heat sensitive coagulating agent and the bottom layer containing for each 100 parts of pigment from about 28 to 100 parts of an anionic latex type binder, from about 0.2 to 0.7 parts of dispersing agent, from 0.75 to 4.5 part of a non-ionic surfactant protective agent and from 0.15 to 3 parts of a heat sensitive coagulating agent.

8. A synthetic paper as in claim 7 wherein the heat-sensitive coagulating agent is selected from the group consisting of water soluble salts of divalent lead, zinc, magnesium, calcium, strontium and barium and trivalent chromium and aluminum in combination with a member of the group consisting of sulphate, phosphate, nitrate and isocyanate and halogen ions; polyvinyl methyl ether, polypropylene glycol; and cationic surface active agents having both a hydrophobic group selected from the group consisting of higher alkyl amines, higher alkyl halides and higher fatty acids, and a hydrophilic group consisting of pyridine, inorganic acids, ethylene oxide, ethanolamines, asymmetrical diamines, aminoethanolamine and polyethylene-polyamines.

9. A synthetic paper as in claim 7 wherein the film is selected from the group consisting of polystyrene, polyvinyl chloride and polyethylene.

10. A synthetic paper as in claim 7 wherein the binder is a butadiene-methyl methacrylate copolymer.

11. A process for the preparation of a coated synthetic paper from about 15 to 300 microns in thickness which comprises coating a plastic film on at least one side with from about 8 to 130 grams per square meter of an aqueous, pigment containing composition having a viscosity of from about 50 to 1000 cps, said composition containing for each 100 parts of pigment from about 28 to 100 parts of an anionic latex type binder, from about 0.2 to 0.7 part of dispersing agent, from 0.75 to 4.5 parts of a non-ionic surfactant protective agent and from 0.15 to 3 parts of a heat sensitive coagulating agent and thereafter drying at a temperature of from about 70°C to a temperature which is about 50°C above the softening point of the plastic film for a period of from about 10 seconds to 2 minutes, then again coating the resulting coated film over the coated side with from about 8 to 130 grams per square meter of an aqueous, pigment containing composition having a viscosity of from about 50 to 1,000 cps, said composition containing for each 100 parts of pigment from about 12 to 20 parts of an anionic latex type binder, from about 0.2 to 0.7 part of dispersing agent, from 0.75 to 4.5 part of a non-ionic surfactant protective agent and from 0.15 to 3 parts of a heat sensitive coagulating agent and thereafter drying in two steps, the first step being a temperature of from about 20°C to 60°C until the viscosity of the coating is from about 1,800 to 1,200 cps, the second step being at a temperature of from about 70°C to a temperature which is about 50°C above the softening point of the plastic film for from 10 seconds to 2 minutes.

12. A coated synthetic paper from about 15 to 300 microns in thickness comprising a plastic film coated on at least one side with from about 5 to 40 grams per square meter of an opaque, printable, pigment containing coat, there being for each 100 parts of pigment from about 12 to 100 parts of and anionic latex type binder, from 0.2 to 0.7 part of a dispersing agent, from about 2 to 20 parts of satin white, from 0.75 to 4.5 parts of a non-ionic surfactant protective agent and from 0.15 to 3 parts of a heat sensitive coagulating agent.

13. A synthetic paper as in claim 12 wherein the heatsensitive coagulating agent is selected from the group consisting of water soluble salts of divalent lead, zinc, magnesium, calcium, strontium and barium and trivalent chromium and aluminum in combination with a member of the group consisting of sulphate, phosphate, nitrate and isocyanate and halogen ions; polyvinyl methyl ether, polypropylene glycol; and cationic surface active agents having both a hydrophobic group selected from the group consisting of higher alkyl amines, higher alkyl halides and higher fatty acids, and a hydrophilic group consisting of pyridine, inorganic acids, ethylene oxide, ethanolamines, asymmetrical diamines, aminoethanolamine and polyethylenepolyamines.

14. A synthetic paper as in claim 12 wherein the coat comprises two layers, the binder content of the top layer being from about 12 to 20 parts binder per 100 parts of pigment, the binder content of the bottom layer being from about 28 to 100 parts binder per 100 parts of pigment.

15. A synthetic paper as in claim 12 wherein the coat is a one layer coat containing from about 20 to 26 parts binder per 100 parts of pigment.

16. A synthetic paper as in claim 12 wherein the film is selected from the group consisting of polystyrene, polyvinyl chloride and polyethylene.

17. A synthetic paper as in claim 12 wherein the binder is a butadiene-methyl methacrylate copolymer.

18. A process for the preparation of a coated synthetic paper from about 15 to about 300 microns in thickness which comprises coating a plastic film on at least one side with from about 8 to 130 grams per square meter of an aqueous, pigment containing composition having a viscosity of from about 50 to about 1,000 cps, said composition containing for each 100 parts of pigment from about 12 to 100 parts of an anionic latex type binder, from 0.2 to 0.7 part of a dispersing agent, from about 2 to 20 parts of satin white, from 0.75 to 4.5 parts of a non-ionic surfactant protective agent and from 0.15 to 3 parts of a heatsensitive coagulating agent and thereafter drying at a temperature of from about 20°C to a temperature which is about 50°C above the softening point of the plastic film for a period of from about 10 seconds to 10 minutes.

19. A process as in claim 18 wherein drying is effected at a temperature of from about 80°C to a temperature which is about 50°C above the softening point of the plastic during a period of from about 10 seconds to 2 minutes.

20. A process as in claim 18 wherein drying is effected in two steps, the first step being from about 70°C to a temperature which is about 50°C above the softening point of the plastic film until the viscosity of the coating is from about 1800 to 200 cps, the second step being at about 20°c to 60°C for from about 3 3 10 minutes.

21. A process as in claim 18 wherein drying is effected in two steps, the first step being at about 20°C to 60°C until the viscosity of the coating is from about 1,800 to 2,000 cps, the second step being from about 70°C to a temperature which is about 50°C above the softening point of the plastic film for 10 seconds to 2 minutes.

22. A synthetic paper as in claim 1 wherein up to about 10 percent of the latex type binder is replaced with a nonlatex type binder.

23. A process as in claim 4 wherein up to about 10% of the latex type binder in at least one layer is replaced with a non-latex type binder.

24. A coated synthetic paper as in claim 7 wherein up to about 10% of the latex type binder in at least one layer is replaced with a non-latex type binder.

25. A process as in claim 11 wherein up to about 10 percent of the latex type binder in at least one layer is replaced with a non-latex type binder.

26. A coated synthetic paper as in claim 12 wherein up to about 10% of the latex type binder is replaced with a non-latex type binder.

27. A process as in claim 18 wherein up to about 10 percent of the latex type binder is replaced with a non-latex type binder.

* * * * *